United States Patent
Choi et al.

(10) Patent No.: US 8,398,894 B2
(45) Date of Patent: Mar. 19, 2013

(54) CATALYST FOR PREPARING CARBON NANOTUBES BY CONTROLLING ITS APPARENT DENSITY

(75) Inventors: Namsun Choi, Daejeon (KR); Hyun-Kyung Sung, Daejeon (KR); Dong Hwan Kim, Daejeon (KR); Sang-Hyo Ryu, Daejeon (KR); Wan Sung Lee, Daejeon (KR); Youngchan Jang, Daejeon (KR)

(73) Assignee: Korea Kumho Petrochemical Co., Ltd., Jongru-Gu, Seoul ( * ) Notice: Subject to any disclaimer, the term of this patent is extended or adjusted under 35 U.S.C. 154(b) by 385 days.

(21) Appl. No.: 12/642,084

(22) Filed: Dec. 18, 2009

(65) Prior Publication Data
US 2011/0006266 A1 Jan. 13, 2011

(30) Foreign Application Priority Data
Jul. 7, 2009 (KR) .................. 10-2009-0061460

(51) Int. Cl.
*H01B 1/00* (2006.01)

(52) U.S. Cl. ........ 252/500; 252/511; 502/174; 502/176; 502/200; 502/238; 502/302

(58) Field of Classification Search .................. 252/500, 252/511; 502/200, 302, 211, 174, 176, 238; 429/231.8, 31.8
See application file for complete search history.

(56) References Cited

U.S. PATENT DOCUMENTS

| 4,388,223 | A * | 6/1983 | Ferlazzo et al. | 502/211 |
|---|---|---|---|---|
| 6,696,387 | B1 * | 2/2004 | Moy et al. | 502/302 |
| 2008/0020282 | A1 * | 1/2008 | Kim et al. | 429/231.8 |
| 2009/0140215 | A1 * | 6/2009 | Buchholz et al. | 252/511 |
| 2009/0181846 | A1 * | 7/2009 | Lim et al. | 502/200 |

FOREIGN PATENT DOCUMENTS

WO  WO 2006/050903  *  5/2006

* cited by examiner

*Primary Examiner* — Khanh Tuan Nguyen
(74) *Attorney, Agent, or Firm* — Kenyon & Kenyon LLP

(57) ABSTRACT

The present invention relates to a catalyst for preparing a carbon nanotube having desired apparent density by controlling the adding amount of co-precipitating agent in the process of preparing a catalyst in order to obtain a catalyst having a minimized particle size. More specifically, this invention relates to a catalyst for preparing carbon nanotube having desired apparent density based upon the reverse-correlation between the amount of co-precipitating agent added in the process of preparing catalyst and the apparent density of catalyst. The carbon nanotube prepared by the catalyst having low apparent density shows excellent electrical conductivity and highly uniformed dispersion in the polymer/carbon nanotube composite.

4 Claims, 1 Drawing Sheet

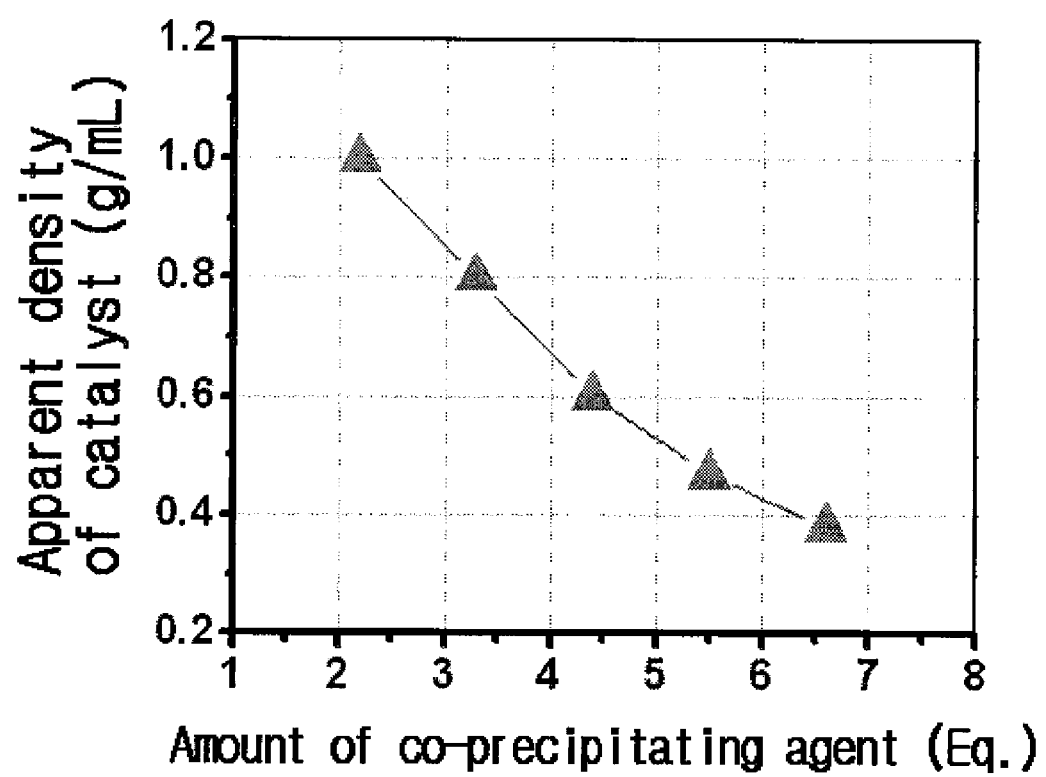

CATALYST FOR PREPARING CARBON NANOTUBES BY CONTROLLING ITS APPARENT DENSITY

BACKGROUND OF THE INVENTION

1. Field of the Invention

The present invention relates to a catalyst for preparing a carbon nanotube having desired apparent density by controlling the adding amount of co-precipitating agent in the process of preparing a catalyst in order to obtain a catalyst having a minimized particle size. More specifically, this invention relates to a catalyst for preparing carbon nanotube having desired apparent density based upon the reverse-correlation between the amount of co-precipitating agent used in the process of preparing catalyst and the apparent density of catalyst. The carbon nanotube prepared by the catalyst having low apparent density shows excellent electrical conductivity and highly uniformed dispersion in the polymer/carbon nanotube composite.

2. Description of Prior Art

Carbon nanotube has a hexagonal honey comb structure in which one carbon atom is bonded with 3 adjacent carbon atoms through $sp^2$-hybridization. Further, it has around 5 to 100 nm of diameter and high aspect ratio as well as a graphite structure which is composed of carbon atoms. Therefore, such a chemical structure of carbon nanotube results in high mechanical strength, excellent electrical and thermal conductivity. Due to these superior physical properties of carbon nanotube, carbon nanotube has been expected as future alternative material by replacing conventional carbon black or carbon fiber. Further, the industrial application of carbon nanotube has been also expected to be expanded.

As the factors for controlling the diameter and aspect ratio of carbon nanotube, the metal element of catalyst, the composition ratio of metal element, the reaction temperature and/or the kind of gas source can be exemplified. Among the factors indicated above, the metal element of catalyst and the composition ratio of metal element can be considered as the most important factor in determining the structure of carbon nanotube. In general, the diameter of carbon nanotube can be determined by the particle size of catalyst. In other words, the diameter of carbon nanotube becomes smaller when the particle size of catalyst becomes smaller.

Even though the catalyst for preparing carbon nanotube can be prepared in various methods, the co-precipitation method and the impregnation method can be widely used for preparing carbon nanotube by chemical vapor deposition method. Generally, the co-precipitation method for preparing catalyst has been preferably used for its convenience, because the porous supported material is not required in this method.

The co-precipitation method comprises the following steps; i) dissolving the metal salt in the water; ii) inducing the precipitation of metal salt by adding co-precipitating agent along with adjusting the pH of the solution; and iii) filtering and drying the obtained precipitates. Finally, the catalyst precursor has been obtained as a powder type. After thermal oxidation or reduction of catalyst precursor, the catalyst for preparing carbon nanotube can be obtained.

The impregnation method requires porous supported material, where metal salt can be impregnated. After mixing metal salt and porous supported material in the aqueous solution, a slurry type of catalyst precursor has been obtained. Then, catalyst precursor has been obtained by filtering and drying the slurry type of catalyst. After thermal oxidation or reduction of catalyst precursor, the catalyst for preparing carbon nanotube can be obtained.

As described above, the catalyst for preparing carbon nanotube according to co-precipitation method or impregnation method can be obtained as a form of fine powder. The particle size of catalyst can be in the range of 100 nm to 500 micrometer, ordinarily 10 micrometer to 100 micrometer.

Since it has a limitation for minimizing the particle size of catalyst according to co-precipitation method, the control of apparent density of catalyst can be an alternative to obtain a catalyst having a minimized particle size. If carbon nanotube has been prepared using a catalyst having a minimized particle size, the carbon nanotube can show excellent physical properties. For example, if the polymer/carbon nanotube composite is prepared using said catalyst, the excellent uniform dispersion and the high electrical conductivity of polymer/carbon nanotube composite can be accomplished.

However, it has not been tried to control the apparent density of catalyst to obtain a catalyst having a minimized particle size. Followings are preparation method of catalyst for preparing carbon nanotube according to co-precipitation method.

According to the paper, 'Journal of the Korean Ceramic Society Vol. 36, No. 5, 504~512, 1999', about 2.2 equivalents of co-precipitating agent as base were used per 1 equivalent of total metals, when preparing two elements of metal catalyst of iron and copper/iron and nickel by a co-precipitation method.

In Korean Early Publication No. 2007-84180 'Catalyst for producing carbon nanotubes by means of the decomposition of gaseous carbon compounds on a heterogeneous catalyst', it has been disclosed that a catalyst for preparing carbon nanotube is prepared by the co-precipitation method in which ammonium carbonate or sodium hydroxide has been added to the metal salt solution comprising Co, Mn, Mo, Al and/or Mg salt. Further, it has been disclosed that less than 2.4 equivalents of co-precipitating agent as base are added per 1 equivalent of total metals. However, it has not been disclosed that apparent density of catalyst can be controlled by adjusting the amount of co-precipitating agent.

In Korean Early Publication No. 2007-86611 'Method for synthesizing a supported catalyst for the production of carbon nanotubes', it has been disclosed that a catalyst for preparing carbon nanotube is prepared by an impregnation method using aluminum hydroxide as supported material. The process for preparing a catalyst comprising i) preparing a paste by mixing aluminum hydroxide having less than 80 μm of particle size in the iron and cobalt salt aqueous solution; ii) selecting and obtaining the catalyst particle having less than 70 μm of particle size after drying and sieving the paste. However, in case of an impregnation method, the particle size of carrier will determine the particle size of catalyst. Therefore, it is hard to control the particle size and apparent density of catalyst. Further, it cannot be considered as an economical method for producing the catalyst in a large scale, because the selection of the catalyst particle having small particle size by sieve requires an inconvenience of process.

Therefore, the amount of co-precipitating agent used in the course of preparing a catalyst for carbon nanotube has been less than 2.5 equivalents as to total metal amounts, because the increase of co-precipitating agent causes the increase of preparation cost of catalyst. Of course, it has not been tried to control the apparent density of catalyst by controlling the amount of co-precipitating agent.

The inventors of the present invention have researched the process for controlling the apparent density of catalyst for preparing a carbon nanotube. We found that the increase of the amount of co-precipitating agent used in the process of a co-precipitation method results in the reduction of apparent density of catalyst. Further, the reduction of apparent density of catalyst causes to minimize the particle size of catalyst. Of course, the catalytic yields of said catalyst having a minimized particle size also can be enhanced. Further, if the carbon nanotube is prepared by said catalyst having a minimized particle size, polymer/carbon nanotube composite can show high electrical conductivity, because the carbon nanotube prepared by said catalyst can be uniformly dispersed in the polymer/carbon nanotube composite.

Finally, the inventors of the present invention developed a method for preparing a catalyst having a minimized particle size by controlling the apparent density of catalyst, which can be accomplished by the adjustment of added amount of co-precipitating agent.

SUMMARY OF THE INVENTION

The object of the present invention is to provide a catalyst for preparing carbon nanotube having desired apparent density to obtain a catalyst having a minimized particle size prepared by the steps comprising: i) preparing a slurry by precipitating the metal elements of catalyst using the co-precipitating agent; ii) filtering, drying, milling and thermally treating the obtained slurry; and iii) obtaining a catalyst for preparing carbon nanotube, wherein the apparent density of catalyst is controlled in the range of 0.3~0.8 g/mL by adding 3~8 equivalents of co-precipitating agent per total mole of metal elements of catalyst calculated as 1 equivalent.

Further, said apparent density of catalyst is controlled in the range of 0.4~0.8 g/mL by adding 3~7 equivalents of co-precipitating agent per total mole of metal elements of catalyst calculated as 1 equivalent.

Further, said co-precipitating agent is at least one selected from ammonia water, ammonium carbonate and ammonium bicarbonate.

Further, said metal element comprises at least one metal element selected from Fe, Ni and Co and at least one supported material selected from Mg, Al, Mo, Mn and Cr.

The further object of the present invention is to provide a carbon nanotube prepared by a chemical vapor deposition method using said catalyst, wherein the electrical conductivity of carbon nanotube is enhanced.

The further object of the present invention is to provide a conductive polymer/carbon nanotube composite containing carbon nanotube prepared using said catalyst, wherein said conductive polymer/carbon nanotube composite shows excellent electrical conductivity and highly uniformed dispersion.

BRIEF DESCRIPTION OF THE DRAWINGS

FIG. 1 illustrates the correlation between the amount of co-precipitating agent and the apparent density of catalyst for preparing carbon nanotube.

DETAILED DESCRIPTION OF THE INVENTION

The present invention relates to a catalyst for preparing carbon nanotube having desired apparent density to obtain a catalyst having a minimized particle size prepared by the steps comprising: i) preparing a slurry by precipitating the metal elements of catalyst using the co-precipitating agent; ii) filtering, drying, milling and thermally treating the obtained slurry; and iii) obtaining a catalyst for preparing carbon nanotube, wherein the apparent density of catalyst is controlled in the range of 0.3~0.8 g/mL by adding 3~8 equivalents of co-precipitating agent per total mole of metal elements of catalyst calculated as 1 equivalent.

Further, the present invention also provides a method for controlling the apparent density of catalyst for preparing carbon nanotube as well as a carbon nanotube having enhanced electrical conductivity prepared by said catalyst. Further, the apparent density of catalyst can be controlled by adjusting the amount of co-precipitating agent during the co-precipitating step in the preparation process for the catalyst.

The controlling method of apparent density of catalyst can be applied to the following process for preparing a catalyst comprising i) preparing a slurry by precipitating the catalyst metal composition using the co-precipitating agent; ii) filtering, drying and milling the obtained slurry; and iii) thermally treating the milled material at high temperature in gaseous condition; iv) milling and obtaining a catalyst in the form of metal oxide for preparing carbon nanotube.

The apparent density of catalyst can be controlled by the ratio of the amount of co-precipitating agent to the total amount of metal element of catalysts. In other words, the increase of co-precipitating agent in the process of preparation of catalyst results in the decline of apparent density of catalyst. Therefore, it has been revealed that the amount of co-precipitating agent and the apparent density of catalyst for preparing carbon nanotube have a reverse-correlation.

The amount of co-precipitating agent can be 3~8 equivalents, preferably 3~7 equivalents, per total mole of metal elements of catalyst calculated as 1 equivalent. If the amount of co-precipitating agent is more than 8 equivalents, the cost for preparing a catalyst will increase. However, if the amount of co-precipitating agent increases to 8 equivalents, the catalytic yield for carbon nanotube can be enhanced. Such an enhanced catalytic yield results in the reduction of manufacturing cost. Further, if carbon nanotube is prepared according to this method, the polymer composite containing this carbon nanotube affords the excellent physical property, such as electrical conductivity, with the reduction of manufacturing cost.

If the amount of co-precipitating agent is less than 3 equivalents, the apparent density of catalyst is so high that the physical property of carbon nanotube cannot be satisfactory. On the other hand, if the amount of co-precipitating agent is more than 8 equivalents, the catalyst yield cannot be fully enhanced, which results in the increase of manufacturing cost.

As the material used for co-precipitating agent, at least one base selected from ammonia water ($NH_4OH$), ammonium carbonate (($NH_4$)$_2CO_3$) and ammonium bicarbonate ($NH_4HCO_3$) can be used. However, if the base containing metal cation, such as sodium hydroxide (NaOH) is used as co-precipitating agent, the metal cation may cause the decline of catalytic activity due to its presence in the catalyst composition.

As the metal element of catalyst, at least one metal selected from Fe, Ni and Co can be used as a main catalyst, while at least one selected from Mg, Al, Mo, Mn and Cr can be included as supported material or co-catalyst.

The catalyst for preparing a carbon nanotube can be obtained by a thermal treatment of the metal precursor after drying and milling the precipitated material. The thermal treatment can be carried out in the range of 400~1200° C. If the temperature is lower than 400° C., volatile or decomposable material can remain in the catalyst composition without being volatilized or decomposed. On the other hand, if the temperature is higher than 1200° C., there will occur the association of the catalyst particles, thus increasing manufacturing cost. If excessive co-precipitating agent is used, the remaining co-precipitating agent shall be decomposed or volatilized during the thermal treatment. Therefore, final catalyst composition does not contain the co-precipitating agent, which does not requires any further process for removing the co-precipitating agent.

The gas used for a heat treatment can be air, nitrogen and a mixture of nitrogen and hydrogen.

The preparation of carbon nanotube having the controlled apparent density can be carried out by a conventional chemical vapor deposition method. The carbon nanotube can be grown by the flow of hydrocarbon source gas in the presence of catalyst at high temperature.

The outstanding advantageous effect of the present invention is to provide a catalyst having desired apparent density by controlling the amount of co-precipitating agent regardless of metal element the ratio of metal element and the particle size of supported materials. Further, the catalyst having desired apparent density can be applied to any of manufacturing methods for carbon nanotube, especially to a fluidized bed method in a convenient way.

Further, in the case of preparing carbon nanotube using fluidized bed reactor, the catalyst composition prepared by the present method will be much more convenient because the catalyst has low apparent density.

The present invention can be explained more concretely by following Examples and Comparative Examples. However, the scope of the present invention shall not be limited by following Examples.

EXAMPLES

Measurement of Apparent Density

The apparent density of catalyst is measured using a stainless steal vessel which has the exact volume of 25 mL (BT\-102 made by Keiwon).

<Measurement of Surface Resistance>

The test specimen (carbon nanotube-MPPO composite) is made by melt mixing carbon nanotube and modified polyphenylene oxide (MPPO). The surface resistance of test specimen is measured by a surface resistance measuring apparatus (Static Solutions, Inc. OHM-STAT RT-1000).

Preparation Example 1

Preparation of Catalyst for Preparing Carbon Nanotube 28.94 g of $Fe(NO_3)_2 \cdot 9H_2O$ (Fe atom 71.6 mmol), 55.62 g of $Al(NO_3)_3 \cdot 9H_2O$ (Al atom 148.3 mmol) and 21.1 g of $Mg(NO_3)_2 \cdot 6H_2O$ (Mg atom 82.3 mmol) are added and stirred with 20 mL of distilled water in 2 L of beaker. Then, metal salt solution is prepared. 78.34 g of $NH_4HCO_3$ (997.3 mmol) is dissolved in 650 mL of distilled water. Then, co-precipitating agent solution is prepared. The prepared co-precipitating agent solution is added drop by drop to metal salt solution, followed by stirring for 1 hour at room temperature. After obtaining precipitating solution, the obtained precipitating solution is filtered. The filtered material is dried in the oven for 24 hours at 120° C., followed by milling the obtained material using a dry type of high speed milling machine. After a thermal treatment of the milled metal powder under air atmosphere for 4 hours at 600° C., fine particles of catalyst is obtained using a dry type of high speed milling machine.

Preparation Example 2

Preparation of Catalyst for Preparing Carbon Nanotube

Catalyst is prepared as the same manner in Example 1 except that 105.1 g of $NH_4HCO_3$ (1329.7 mmol) is dissolved in 800 mL of distilled water for preparing co-precipitating agent solution.

Preparation Example 3

Preparation of Catalyst for Preparing Carbon Nanotube

Catalyst is prepared as the same manner in Example 1 except that 131.4 g of $NH_4HCO_3$ (1662.1 mmol) is dissolved in 900 mL of distilled water for preparing co-precipitating agent solution.

Preparation Example 4

Preparation of Catalyst for Preparing Carbon Nanotube

Catalyst is prepared as the same manner in Example 1 except that 157.7 g of $NH_4HCO_3$ (1994.5 mmol) is dissolved in 1200 mL of distilled water for preparing co-precipitating agent solution.

Comparative Preparation Example 1

Preparation of Catalyst for Preparing Carbon Nanotube

Catalyst is prepared as the same manner in Example 1 except that 52.6 g of $NH_4HCO_3$ (664.8 mmol) is dissolved in 400 mL of distilled water for preparing co-precipitating agent solution.

Example 1

Preparation of Carbon Nanotube

The carbon nanotube is prepared using the catalyst prepared in Preparation Examples and Comparative Preparation Example. Followings are the detailed preparation method. 1 g of catalyst is uniformly dispersed on the quartz plate, and quartz plate is located at the center of 100 mL of quartz bed. Quartz plate is heated to 650° C. under nitrogen atmosphere. The mixed gas of 0.8 L/min of ethylene and 0.2 L/min of hydrogen is flown for 30 minutes. Then, carbon nanotube is prepared. The catalytic yield is calculated by the following equation.

Catalytic yield={(The amount of obtained carbon nanotube−The amount of added catalyst)/The amount of added catalyst}

Example 2

Evaluation of Properties of Carbon Nanotube

The electrical conductivity of carbon nanotube is evaluated by the following method. After uniformly mixing 50 g of modified polyphenylene oxide (MPPO; KUMHO HSP8390 grade) and 0.5 g of carbon nanotube, the mixture is added to a Haake mixer at 270° C., followed by melting and extruding the mixture for 10 minutes at 50 rpm. Finally, MPPO-carbon nanotube polymer composite is obtained. Then, the obtained polymer composite is processed in the form of sheet by a hot press method under 3000 psi pressure at 270° C. for 10 minutes. The electrical conductivity is measured with surface resistance of the obtained MPPO-carbon nanotube polymer composite sheet. Table 1 shows the results.

TABLE 1

The evaluation of prepared carbon nanotube

| Catalyst | Prep. Example 1 | Prep. Example 2 | Prep. Example 3 | Prep. Example 4 | Com. Prep. Example |
| --- | --- | --- | --- | --- | --- |
| The amount of $NH_4HCO_3$ (Eq.) | 3.3 | 4.4 | 5.5 | 6.6 | 2.2 |
| Apparent density of catalyst (g/ml) | 0.8 | 0.6 | 0.47 | 0.38 | 1.1 |
| Catalytic yield (fold) | 13.1 | 13.6 | 14.5 | 13.9 | 10.2 |
| Surface resistance of MPPO-carbon nanotube polymer composite (Ω/sq.) | 14100 | 12600 | 10100 | 9200 | 17820 |

1. The amount of $NH_4HCO_3$ (Eq.): Equivalent ratio per total metal elements
2. MPPO-carbon nanotube polymer composite (containing 1 wt part of carbon nanotube)

What is claimed is:

1. A process for preparing a catalyst having 0.3~0.8 g/mL apparent density for preparing carbon nanotubes by controlling the amount of a co-precipitating agent showing inverse-correlation with the apparent density of the catalyst, the process comprising:
   i) preparing a slurry by precipitating a metal element of the catalyst using the co-precipitating agent;
   ii) filtering, drying, milling and thermally treating the obtained slurry; and
   iii) obtaining the catalyst for preparing carbon nanotubes, wherein the apparent density of the catalyst is controlled by adding 3~8 equivalents of the co-precipitating agent when a total mole amount of the metal element of the catalyst is converted into 1 equivalent, and
   wherein the amount of the co-precipitating agent shows inverse-correlation with the apparent density of the catalyst.

2. The process for preparing the catalyst for preparing carbon nanotubes according to claim 1, wherein said apparent density of the catalyst is controlled in the range of 0.4~0.8 g/mL by adding 3~7 equivalents of the co-precipitating agent when the total mole amount of the metal element of the catalyst is converted into 1 equivalent.

3. The process for preparing the catalyst for preparing carbon nanotubes according to claim 1, wherein said co-precipitating agent is at least one selected from ammonia water, ammonium carbonate and ammonium bicarbonate.

4. The process for preparing the catalyst for preparing carbon nanotubes according to claim 1, wherein said metal element comprises at least one catalytic metal selected from Fe, Ni and Co and at least one supported material selected from Mg, Al, Mo, Mn and Cr.

* * * * *